(12) United States Patent
Reese et al.

(10) Patent No.: US 9,330,393 B2
(45) Date of Patent: May 3, 2016

(54) PROVIDING A RESULT WITH A REQUESTED ACCURACY USING INDIVIDUALS PREVIOUSLY ACTING WITH A CONSENSUS

(75) Inventors: Byron William Reese, Georgetown, TX (US); William Ballard, Austin, TX (US)

(73) Assignee: Demand Media, Inc., Santa Monica, CA (US)

( * ) Notice: Subject to any disclaimer, the term of this patent is extended or adjusted under 35 U.S.C. 154(b) by 0 days.

(21) Appl. No.: 13/539,152

(22) Filed: Jun. 29, 2012

(65) Prior Publication Data

US 2012/0277887 A1    Nov. 1, 2012

Related U.S. Application Data

(63) Continuation of application No. 12/706,927, filed on Feb. 17, 2010, now Pat. No. 8,290,812.

(51) Int. Cl.
*G06Q 10/06* (2012.01)
*G06Q 30/02* (2012.01)

(52) U.S. Cl.
CPC ............ *G06Q 30/02* (2013.01); *G06Q 10/0639* (2013.01)

(58) Field of Classification Search
CPC ................................. G06Q 30/02; G06Q 10/06
USPC ........................................................ 705/7.32
See application file for complete search history.

(56) References Cited

U.S. PATENT DOCUMENTS

| | | | |
|---|---|---|---|
| 6,266,570 B1 | 7/2001 | Hocherl et al. | |
| 7,222,078 B2 | 5/2007 | Abelow | |
| 8,290,812 B2 | 10/2012 | Reese et al. | |
| 2004/0049499 A1 | 3/2004 | Nomoto et al. | |
| 2007/0027845 A1 | 2/2007 | Dettinger | |
| 2007/0083506 A1 | 4/2007 | Liddell et al. | |
| 2011/0202390 A1 | 8/2011 | Reese et al. | |

FOREIGN PATENT DOCUMENTS

WO    2011103086    8/2011

OTHER PUBLICATIONS

International Patent Application Serial No. PCT/US2011/024875, International Search Report and Written Opinion, Sep. 30, 2011.
Wikipedia, "Digg", accessed Dec. 11, 2009, http://en.wikipedia.org/wiki/Digg.

*Primary Examiner* — Thomas Dixon
(74) *Attorney, Agent, or Firm* — Greenberg Traurig LLP (57) ABSTRACT

A result for a task may be provided in response to receiving a request from, for example, a user for the result. The request specifies a desired accuracy level for the result. The accuracy of the result is determined using the individual accuracies of one or more persons that have selected the result. Each person's individual accuracy is determined based on results for prior tasks previously performed by that person. The person's individual accuracy is proportional to the number of that person's prior results that are with a consensus of other persons that have performed the same prior task. The result is provided if the accuracy of the result is equal to or greater than the desired accuracy level.

19 Claims, 6 Drawing Sheets

PROVIDING A RESULT WITH A REQUESTED ACCURACY USING INDIVIDUALS PREVIOUSLY ACTING WITH A CONSENSUS

CROSS-REFERENCE TO RELATED APPLICATIONS

This application is a continuation application of, and claims priority to, U.S. patent application Ser. No. 12/706,927, filed Feb. 17, 2010, entitled "Providing a Result with a Requested Accuracy Using Individuals Previously Acting with a Consensus," by Byron Reese and William Ballard, the entire contents of which application is incorporated by reference as if fully set forth herein.

FIELD OF THE TECHNOLOGY

This disclosure relates generally to data processing systems, and more specifically to methods, systems and machine-readable mediums for providing a result in response to a request in which the result has an accuracy determined based on the individual accuracies of one or more persons that have acted with a consensus in prior activities.

BACKGROUND

Business processes often include a large number of tasks that need to be accomplished with varying degrees of accuracy. Some of these tasks may include, for example, the selection of keywords that are relevant for a given topic, the keying in of phone numbers or other data entry, and the transcription of medical records.

In performing a task, people typically do not achieve perfect accuracy (e.g., some members of a large group will fail to select a correct answer from a set of choices, or a given person will sometimes fail a few times when repeating a tedious task many times). Instead, people inevitably will make some mistakes, even with relatively simple tasks. The error rates for a typical person in the performance of a particular task might be, for example, 5-10% (i.e., the person is 90-95% accurate over many attempts at the same task). The error rate (or accuracy) depends upon, among other factors, training and the particular type of task performed.

BRIEF DESCRIPTION OF THE DRAWINGS

Various features of the present disclosure will become more apparent with reference to the following description taken in conjunction with the accompanying drawings wherein like reference numerals denote like elements and in which.

DETAILED DESCRIPTION

In the description that follows, the present disclosure may be described in reference to one or more embodiments for providing a result (e.g., to an end user or to a software process executing on a computer system) if the result is determined to have an accuracy level equal to or greater than a requested accuracy level. The present disclosure, however, is not limited to any particular application, nor is it limited by the examples described below. Various modifications to the disclosed embodiments may be apparent to those skilled in the art and the general principles defined herein may be applied to other embodiments and applications without departing from the spirit and scope of the disclosure. Therefore, the description of the embodiments that follow are for purposes of illustration and not limitation.

Reference in this specification to "one embodiment", "an embodiment", "other embodiments", or the like means that a particular feature, structure, or characteristic described in connection with the embodiment is included in at least one embodiment of the disclosure. The appearances of, for example, the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The disclosure below generally provides systems, methods and machine-readable mediums for providing a result corresponding to a particular task (e.g., the task of selecting a word or title from a list of words or titles, with the result being the selected word or title). The systems may include a storage device and a processor. The computer readable mediums provide instructions to cause the processor to perform the operations described herein.

A request (e.g., a request from a person at a user terminal, a request from a software process, or an automated request from another computing system) is received that asks that a result be provided (e.g., providing a selected title from a list of titles). The request specifies a desired accuracy level for the result. The accuracy of the result is determined using an individual accuracy of one or more persons that select the result, as discussed in more detail below. For example, if two or three highly-accurate individuals select the same title from a list of possible titles to choose from, then that same selected title is likely to be a sufficiently accurate result that can be provided in response to a user's request. In general, the previously-demonstrated accuracy of one, two, or more individuals is relied upon or used for making the selection of a new title requested by the user.

Each person's individual accuracy is determined based on prior results to prior tasks previously performed by that person. For example, a "batting record" or voting history is recorded for each person based on how that person acts or votes relative to other persons performing the same prior task (i.e., whether the person acts with or against a consensus). Each person's individual accuracy is proportional to the number of that person's prior results that are with a consensus of other persons that have performed the same prior task (e.g., a person has a higher individual accuracy if that person consistently votes or acts with the consensus of persons performing the same task). The result is provided if the accuracy determined for the result is equal to or greater than the desired accuracy level that was initially requested. Various embodiments and features of the present disclosure will be apparent from the accompanying drawings and from the detailed description which follows.

Figure 1:
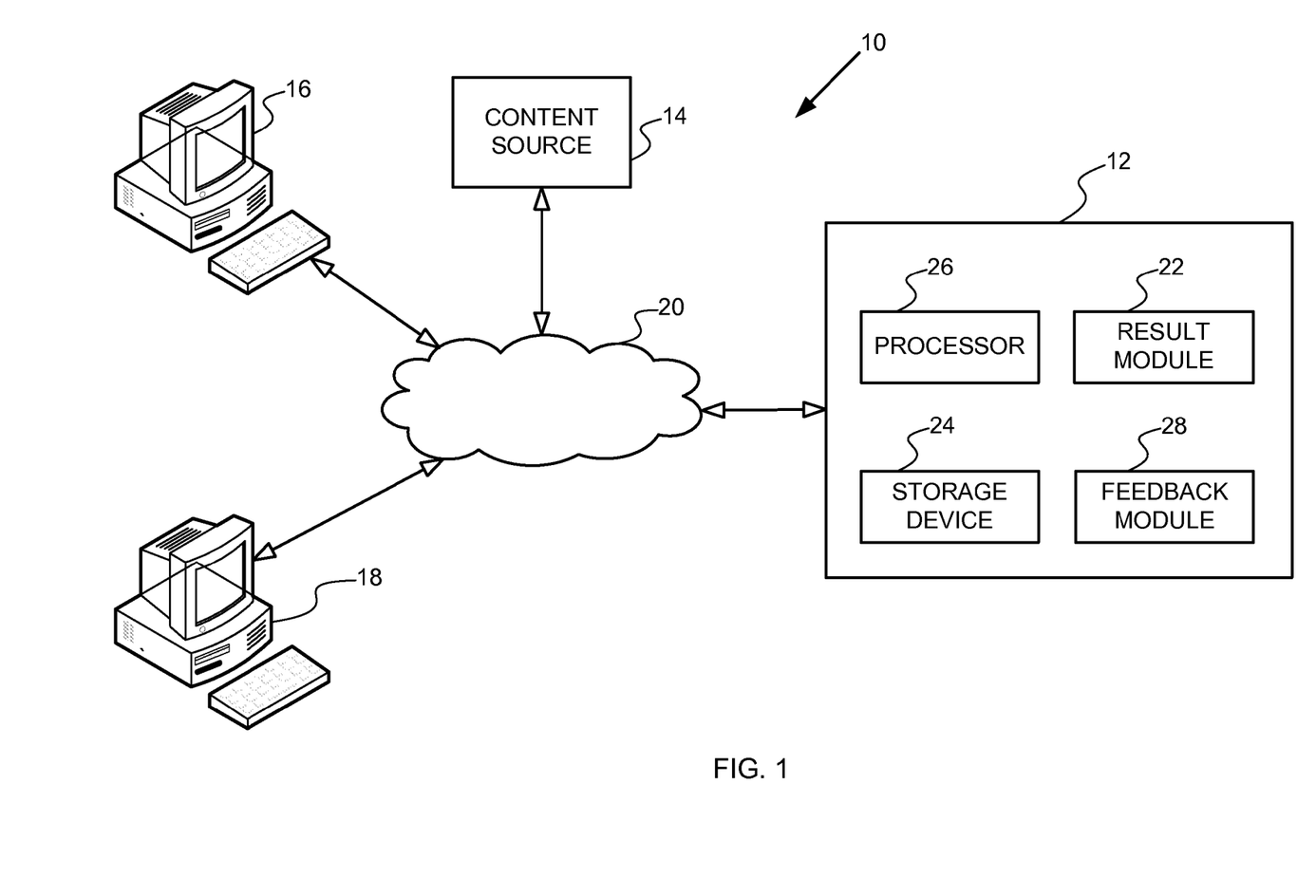
FIG. 1 is an exemplary block diagram of a system for providing a result to a user satisfying a desired accuracy level requested by the user, according to one embodiment of the present disclosure.

FIG. 1 is an exemplary block diagram of a system 10 for providing a result to a user (or alternatively another computer process or system) that satisfies a desired accuracy level requested by the user, according to one embodiment of the present disclosure. The system 10 may include a computing device 12, a content source 14, a plurality of feedback provider terminals 16, and at least one user terminal 18. The components of the system 10 may be distributed over a network 20 (e.g., computing device 12 may include several processors, or more than one computing device 12 may be used to perform various functions described herein).

The network 20 may be an internet or intranet, or a combination thereof. For example, the components of the system 10 may be selectively distributed over the Internet as well as maintained within an intranet of an organization. In one embodiment, the terminals 16 and 18 may run commercially-available Web browser applications such as Microsoft Internet Explorer®, which implements World Wide Web standards such as HTTP, HTML, XML, java, Flex, Ajax and the like.

In one embodiment, the computing device 12 may include a processor 26, one or more modules, and one or more databases. For example, the computing device 12 may include a storage device 24, a result module 22, and feedback module 28. The processor 26 may be a commercially-available processor that accesses the content source 14 and/or dynamically generates Web pages in response to end user actions (e.g., as requested by an end user of a cell phone or personal digital assistant). In some embodiments, the computing device 12 may include a processor with multiple processing cores.

The Web pages may be in the form of HTML pages or the like. For example, the Web pages generated may include a result requested by the user if the result has an accuracy equal to or greater than a requested accuracy level. The Web page may include content materials (e.g., related to the result being provided).

In one embodiment, the Web page may be provided by result module 22 to, for example, a user that is operating user terminal 18. The web page may be used, for example, to present the result to the user (along with other information, such as the actual accuracy determined by result module 22 for the result being provided). If the desired accuracy level could not be achieved, the actual accuracy determined may be provided in the web page, along with other statistics on individuals used to determine the accuracy.

For example, the user may have initially made a request for a title to be used with an article that the user intends to create and publish. The user may have requested that the title have an accuracy level of, for example, 90%. The web page may present the result to the user in the form of a selected title that the user can use for the content publication (e.g., article) that the user intends to create. The selected title may have an accuracy of, for example, 93% as determined by result module 22. The web page may present this accuracy to the user along with the title.

The title is presented to the user here because it has an accuracy (i.e., 93%) that is greater than the accuracy requested by the user. If computing device 12 were not able to calculate an accuracy for any title that was at least 90% as requested, then result module 22 would, for example, notify the user in the web page that an acceptable title is not available.

In one embodiment, feedback module 28 is used to determine individual accuracies for a group of persons. In one embodiment, these persons may, for example, have previously performed a task similar to or the same as that for which the user of user terminal 18 is requesting a result (i.e., the persons may have prior experience in selecting suitable titles for content publications, and the persons may have selected such titles with the consensus in most situations).

In one embodiment, a number of individuals are feedback providers using feedback provider terminals 16. The feedback providers may be, for example, employees or contractors of an entity that operates computing device 12. Feedback module 28 may be used to send surveys to these feedback providers. Feedback from each survey is used to develop an individual "batting record" or activity history for each individual. These activity histories are used to calculate individual accuracies, as discussed further below, and may be stored in storage device 24.

If an individual votes with the consensus for a given survey, then that individual is considered to have voted accurately. That individual's performance over a number of such surveys is used to calculate the individual's accuracy. For example, if the individual votes with a consensus in 80 out of 100 surveys, then the individual's accuracy is 80%. Individual accuracies are similarly determined for the other feedback providers. These individual accuracies are then used by result module 22 to calculate an accuracy for a new result being requested (e.g., requested by an end user or customer on user terminal 18). For example, the feedback providers may be employees that a service company has on staff for use in rapidly responding to a request from a customer on user terminal 18 (e.g., logged into a web site for the service company).

In one embodiment, the result module 22 and the feedback module 28 may be implemented together in the computing device 12, as shown in FIG. 1. Alternatively, the result module 22 and the feedback module 28 may be implemented in separate computing devices coupled locally or remotely over the network 20.

In an alternative embodiment, if the accuracy of a result is less than a desired accuracy level, the plurality of choices is discarded, and a result is selected from a new set of choices. The result from the new set is provided if the desired accuracy level can be satisfied. For example, the initial plurality of choices may be an initial list of potential titles for a content item. The new set of choices may be a new list of potential titles for the content item. The new list may differ from the initial list by one or more titles. Also, the new list may be completely different from the initial list.

In one embodiment, any portion of the storage device 24 can be provided externally from the computing device 12, either locally to the computing device 12 or remotely over the network 20. The external data from an external storage device can be provided in any standardized form which the processor 26 can understand. For example, an external storage device at a provider can advantageously provide content material in response to requests from the processor 26 in a standard format, such as, for example, images, videos, audios, text-based material and the like, which the processor 26 may then transform into a function call format that the code module(s) can understand. The processor 26 may be used to provide a standard SQL server, where dynamic requests from the server builds forms from one or more databases used by the computing device 12 as well as stores and retrieves related data on the storage device.

As can be appreciated, the storage device 24 may be used to store, arrange and retrieve data. The storage device 24 may be a machine-readable medium, which may be any mechanism that provides (e.g., stores) information in a form readable by a processor. For example, the machine-readable medium may be a read only memory (ROM), a random access memory (RAM), a cache, a hard disk drive, a floppy disk drive, a magnetic disk storage media, an optical storage media, a flash memory device or any other device capable of storing information. Additionally, a machine-readable medium may also comprise computer storage media and communication media. A machine-readable medium may include volatile and non-volatile, removable and non-removable media implemented in any method or technology for storage of information such as computer-readable instructions, data structures, program modules or other data. A machine-readable medium may also include, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by a computer.

As shown in FIG. 1, the content source 14 may be an external source for storing and retrieving content material and be remotely accessible over the network 20. In one embodiment, the content source 14 may also be an internal source maintained in the computing device 12 or locally coupled to the computing device 12. In one embodiment, the content source 14 may constitute a plurality of smaller sources, or databases, that in the aggregate are represented by the content source 14. The content source 14 may be managed or maintained by third party entities different from those managing the computing device 12 or components thereof. The content material stored and retrieved from the content source 14 may include, but is not limited to, images, videos, audios, text-based material, and/or links or hyperlinks to images, videos, audios, text-based material and the like.

Figure 2:
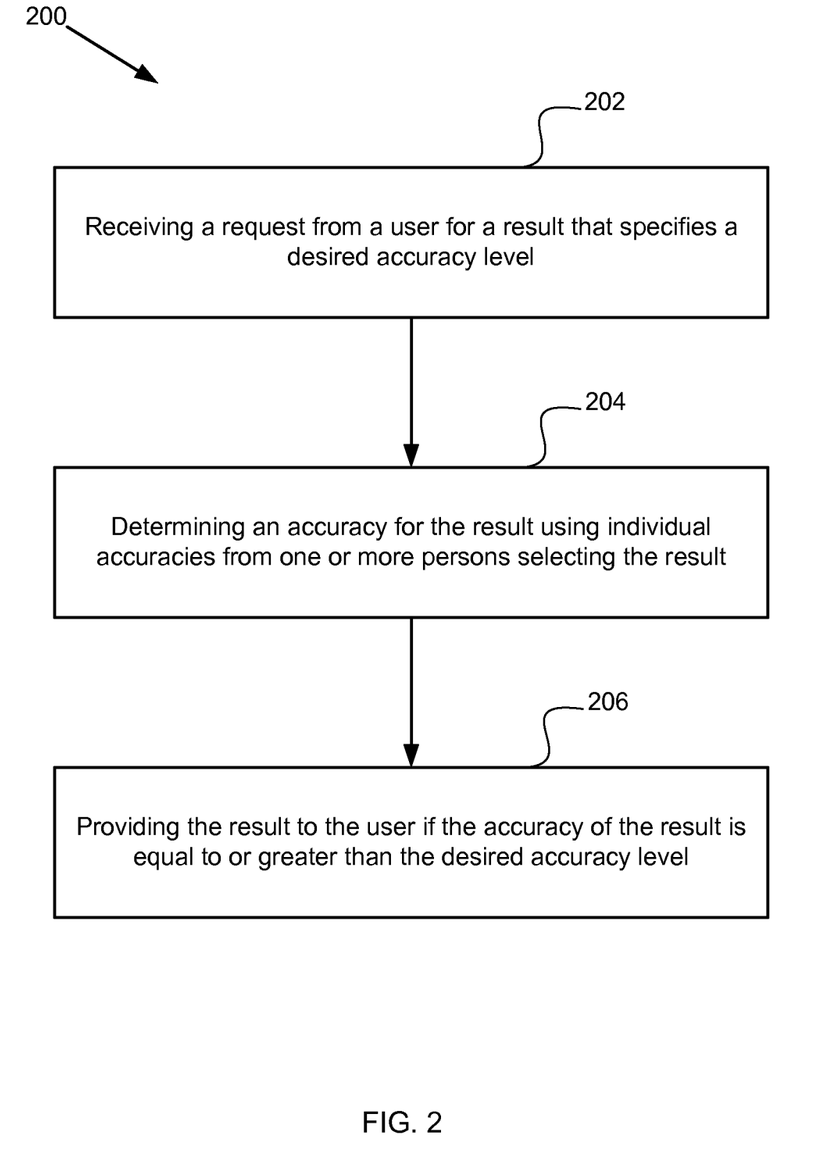
FIG. 2 is an exemplary flowchart outlining the operation of the result module of FIG. 1, according to one embodiment of the present disclosure.

FIG. 2 is an exemplary flowchart outlining a process 200 for the operation of result module 22, according to one embodiment of the present disclosure. In block 202, a request is received from a user of user terminal 18 requesting that a result be provided (e.g., for a task such as selecting a best title from a list of title choices). The request specifies a desired accuracy level (e.g., that the accuracy be at least 90%).

In block 204, result module 22 requests that one or more individuals operating feedback provider terminals 16 make a selection of a result (e.g., select a title from a list of titles) in response to the request from user terminal 18. Each individual is presented with a set of choices (e.g., 3-4 title choices) and then selects one of the choices. The individual in some cases may use a predefined set of standards to use in making the selection (e.g., standards or guidelines for valuable or desirable titles previously provided to and reviewed by employees of an online media services company).

In some embodiments, these individuals will be paid compensation for each selection made (e.g., working as a contractor). In one embodiment, a cost may be associated with the selection of a result by each of the individuals. The sum of the costs for all individuals is a total cost for providing the result. Additional individuals can be used to make selections in an attempt to achieve the desired accuracy level. However, repeatedly adding further individuals may be stopped if the total cost reaches a predetermined maximum (e.g., a maximum cost of $0.50).

For example, if two individuals each have an individual accuracy of 80%, and both individuals select the same "Title B" from a list of titles "Title A, Title B, Title C, and Title D," then result module 22 determines an accuracy of 96% for the Title B result. This is greater than the requested accuracy level of 90%, so result module 22 provides Title B as a result to user terminal 18 via network 20. Alternatively, if the user had requested an accuracy level of 98%, then result module 22 would ask additional individuals on terminals 16 make a title selection in an effort to reach the 98% requested accuracy.

It should be noted that in alternative embodiments, the individuals may have made selections of results prior to receiving a request from the user. In this case, result module 22 uses preexisting records of one or more individuals in an attempt to satisfy the new request and desired accuracy level. Each such record may, for example, include a title or other result previously selected by that individual in response to a task.

With respect to the accuracy for various types of tasks or activities, the accuracy of a result is determined based on the selections or actions of individuals using individual accuracies as determined from their prior consensus activities as described herein. For some tasks, there will be an objectively correct answer. For other tasks, there will be a reasonably correct answer (e.g., as determined by the majority of people in a given group or society or particular social network), but the degree of objectivity may be less clear. For yet other tasks, there may be an increased subjective aspect to an "accurate" result. The approaches described herein may be used in general with all of the foregoing and other forms of accuracy.

In block 206, if the accuracy of the result is determined to be at least equal to the desired accuracy level that was initially requested, then result module 22 provides the result to the user. In some cases, particularly as the requested accuracy level increases (e.g., 99%), it will not be practical (or it may even be impossible) to provide the result as the desired accuracy cannot be achieved, even when using a large number of individuals. In some embodiments, result module 22 will stop adding additional individuals after reaching a predetermined number of individuals already used (e.g., stop after using 10 individuals). In some embodiments in which individuals are compensated for providing selections, this limiting of the number of individuals is done to control the expense of providing a result.

As can be appreciated, it is typically more difficult to obtain a result as the desired accuracy level increases. In some embodiments, the user or other requestor of a result pays a fee to the operator of computing device 12 based on the requested accuracy level, with the fee being greater for a higher desired accuracy level.

In some embodiments, empirical data may be collected in order to determine the difficulty of obtaining a consensus in a given type of situation. For some tasks, it is easy to get a consensus (e.g., which color is the brighter of two choices). The data may show, for example, that 20% of the time a consensus is obtained using two persons (i.e., in two votes), 40% of the time in three votes, and that 60% of the time, four or more people are necessary to obtain a consensus. From this data, a cost model may be determined (e.g., the number of times the title is presented multiplied by the cost (e.g., 5 cents) that is paid each time the title is shown to a person).

Figure 3:
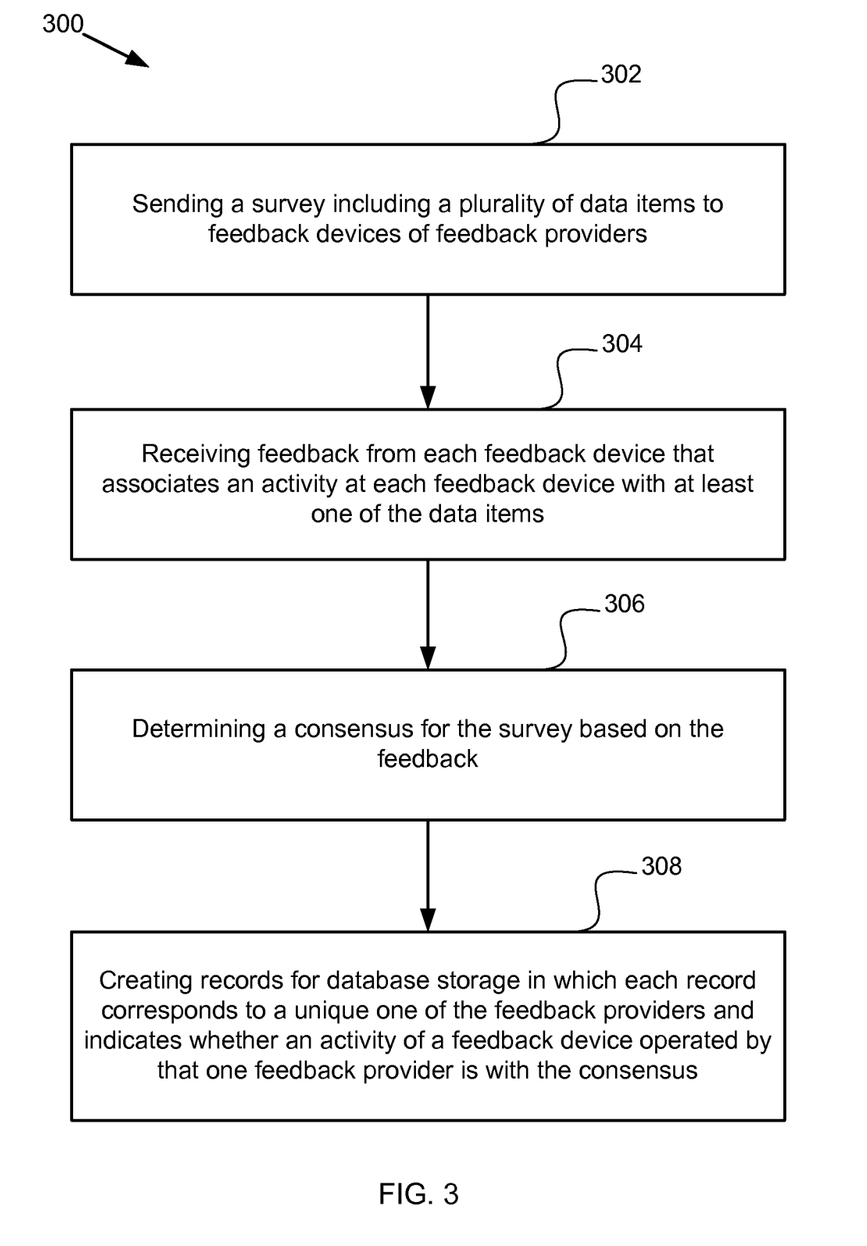
FIG. 3 is an exemplary flowchart outlining the operation of the feedback module of FIG. 1, according to one embodiment of the present disclosure.

FIG. 3 is an exemplary flowchart outlining a process 300 for the operation of feedback module 28, according to one embodiment of the present disclosure. As discussed above, result module 22 uses individual accuracies of persons or feedback providers in order to calculate or determine an accuracy for a new or current result that may be provided to a user at user terminal 18 or to another requesting person, entity, process, or computer system. The individual accuracies may be stored as a plurality of records in storage device 24. The plurality of records are typically created prior to receiving the request for a result.

In one embodiment, the individual accuracies are determined by process 300. In block 302, a survey is sent to feedback devices or terminals 16 (e.g., personal digital assistants, computer workstations, or cell phones). The survey includes a plurality of data items (e.g., a list of titles or images) and each feedback device 16 is operated by a person or feedback provider.

In block 304, feedback is received from each feedback device 16. The feedback associates an activity at each respective feedback device 16 with at least one of the data items. The feedback provider may select one data item as being, for example, the correct choice, the best choice, or the most-desirable choices. As mentioned above, the feedback provider may use standards for selection that are defined by another entity and/or reviewed by the feedback providers prior to the survey. All of the survey responses are collected for analysis by feedback module 28.

In block 306, the feedback (i.e., the selections by the feedback providers) are used to determine a consensus selection or result for the survey. In some embodiments, the consensus result is the result selected by the majority of feedback providers. Each individual's selection is analyzed to determine whether the individual acted or selected with the consensus or against the consensus.

In some embodiments, one or more individuals may be identified as having a low individual accuracy. For example, if the individual is an employee, then the cost of employing the individual may exceed the revenue generated based on accurate choice selections. In this case, the use of the employee in choice selections may be ended.

In other embodiments, whether or not the individual is paid any compensation, an individual may no longer be used in further accuracy determinations if the individual accuracy of the individual falls below a minimum individual accuracy threshold. This cessation of use may be temporary or permanent. In alternative embodiments, it has been found that some individuals may have a high accuracy in some types of tasks, but not in other types of tasks. These tasks may be determined from observation of the individual or from empirical data. The individual may be used only for those types of tasks in which the individual has a high or acceptable accuracy.

In block 308, the plurality of records is created so that each record corresponds to one of the individuals or feedback providers. Each record indicates whether an activity of the feedback device 16 operated by that individual is with the consensus.

Additional surveys are performed in which additional activity or selection feedback is obtained with respect to each individual or feedback provider. An individual's accuracy is determined based on the percentage of surveys in which the individual acted with the consensus. For example, an individual accuracy of 90% means that the individual acted with the consensus in 9 of 10 surveys performed.

In some embodiments, the items provided to feedback providers in a survey may be a list of two or more content materials (e.g., the content materials may be displayed to the feedback provider on a display). The feedback module 28 may provide code instructions to transmit a plurality of content materials to a plurality of feedback provider terminals 16, and query the plurality of feedback provider terminals 16 to identify at least one content material from the plurality of content materials that is being selected in the survey. The feedback module 28 may then receive a feedback, from each of the plurality of feedback provider terminals 16, identifying the at least one content material being selected. In one embodiment, the feedback module 28 may then evaluate the feedback, from each of the plurality of feedback provider terminals 16, to determine the individual accuracies. In one embodiment, a consensus may be based on the frequency of at least one content material being selected by the plurality of feedback provider terminals 16.

In one example, an individual accuracy may have been determined to be 80%. However, even given a mathematical accuracy for an individual, the confidence in this accuracy may be low if the number of prior events or surveys is small. The individual may be run through additional trial tasks that are not used to provide results to customers in order to develop an improved history for that individual with a higher confidence. For example, an employee may be paid to provide the answers in these trial surveys, but those answers are only used for calculating an updated individual accuracy. For example, an employee might be run through about 100 problems in order to measure how often this individual votes with the consensus. At this point, there is a sufficient history and an accuracy may be established for that person with higher confidence.

As can be appreciated, the feedback module 28 may provide code instructions to store the individual accuracies in the storage device 24. In one embodiment, the feedback module 28 may also provide code instructions to store the feedback, from each of the plurality of feedback provider terminals 16, in the storage device 24.

The feedback module 28 may be operatively associated with the result module 22 to provide a response to any request that is received for a result. The result module 22 may receive the request from the at least one user terminal 18. In response to the request, the feedback module 28 may provide code instructions to retrieve the individual accuracies from the storage device 24 for use by result module 22. The result module 22 may then provide a result to the at least one user terminal 18.

As an example of one type of survey, a list of content materials (e.g., keywords or images) may be provided in a survey. The task for the feedback providers is to select the content material(s) that is best associated with a proposed title for an online publication. For example, for a given title of "Apple," the feedback module 28 may transmit content material associated with the fruit apple and the software company Apple, Inc. The feedback module 28 may then query the plurality of feedback provider terminals 16 to select, vote, rank and/or identify at least one choice from the plurality of content materials that is best associated with the title "Apple." In one embodiment, the feedback module 28 may query the plurality of feedback provider terminals 16 to select only a single one of the content materials from the plurality of content materials as being associated with the title "Apple."

In one embodiment, the feedback module 28 may be programmed with code instructions to receive a feedback, from each of the plurality of feedback provider terminals 16, identifying the at least one content material that has been selected and to store the feedback for each of the plurality of feedback provider terminals 16 in the storage device 24. In one embodiment, the feedback providers may be professionals, writers, publishers, critics, other individuals and/or entities who provide a feedback, via the feedback provider terminals 16, that identifies the at least one content material being selected by that individual. In alternative embodiments, the feedback may be data or other information provided from a software process or machine (e.g., automatically provided with or without an explicit instruction from a person). For example, the operation itself of a cell phone, PDA or other computing device may imply or be associated with selections that then can be collected as feedback, and used to define a consensus and to calculate individual accuracies.

In one embodiment, individual accuracies as determined from the feedback may be based on the frequency of at least one content material being selected by the plurality of feedback provider terminals 16. For example, the individual accuracies may be determined based on a consensus voting received from the feedback provider terminals 16.

As can be appreciated, the result module 22 of the computing device 12 may be programmed with code instructions to receive a request from at least one user terminal 18, and then provide a result as discussed above. The present disclosure may be used for various applications to provide a result (e.g., to provide a selection or decision as a result to a user when the user is faced with or handling a problem having more than one choice available). These various applications include, but are not limited to, selecting a correct answer from a set of possible or presented choices, selecting the best keyword search terms to use (e.g., in association with an online content publication), selecting correct grammar for a title (e.g., from a set of the most likely or most reasonably possible choices), selecting the best matching of a title to a topic, selection of the best or the most correct photos to accompany a title, the keying in of phone numbers or other data entry, the transcription of medical records, and/or selection of a best or correct editorial category for a title. In other embodiments, the task to be performed could be the selection of a favorite service provider (e.g., restaurant) or product. The set of possible choices could be determined from various information databases (e.g., an online yellow pages directory for a particular geographic location).

Figure 4:
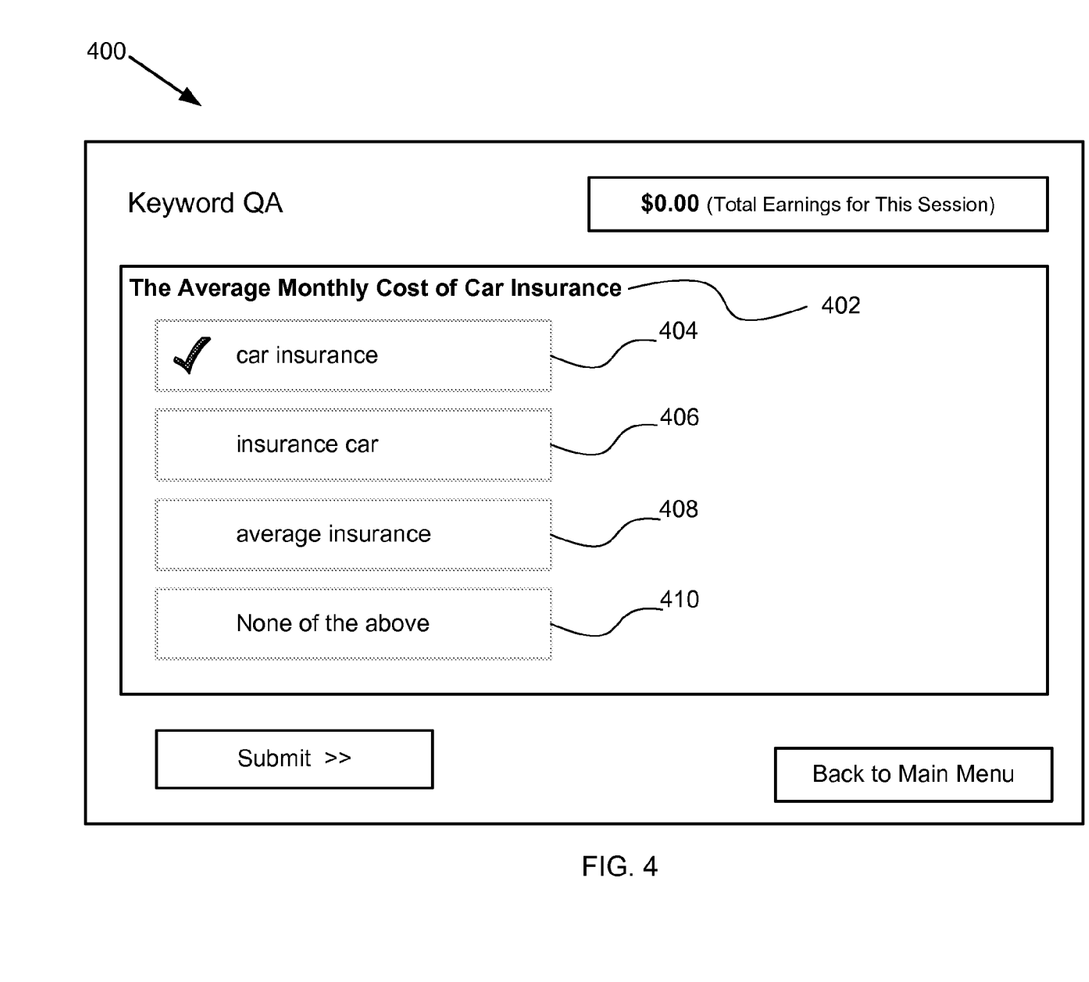
FIG. 4 is an exemplary screen shot illustrating a task of selecting a keyword result by two initial persons to match a predetermined title, according to one embodiment of the present disclosure.

FIG. 4 is an exemplary screen shot 400 illustrating a task of selecting a keyword result by an initial two persons to best match a predetermined title, according to one embodiment. More specifically, here a list of choices is presented in screen shot 400 (e.g., a web page) to each of two feedback providers in which the list includes a set of various phrases 404, 406, 408, and 410 for potential use as keywords for a title 402. One of the choices 410 is "None of the above." In this example, the two feedback providers, each previously determined to have an individual accuracy of 80% as stored in records a database, select a choice. A result (i.e., a title) has been requested (e.g., so that the title result can be used in later steps of a title quality assurance process) having a desired accuracy level of 90%. If the two feedback providers each select choice 404, then this result is determined to have an accuracy of 96% (i.e., calculated as [1−(0.20×0.20)]×100%) and is provided as the requested result due to the accuracy being greater than 90%.

If the two feedback providers do not agree on the best matching keyword, then the set of choices is sent to a third feedback provider (to act as a "tie breaker"). The third feedback provider also has an individual accuracy, which is used along with the individual accuracies of the initial two feedback providers to calculate an accuracy for the choice selected by the third feedback provider. If this accuracy is greater than the desired accuracy level, then the choice selected by the third feedback provider is provided as the requested result.

It should be noted that as the desired accuracy level increases, there will be more cases in which the addition of the third feedback provider will not "break the tie" (i.e., the desired accuracy level is not reached). In such a case, additional feedback providers may be presented with the set of choices, or a reduced set of choices, in an attempt to reach the desired accuracy level. In one embodiment, each choice of the reduced set of choices has previously been selected by a prior feedback provider.

Figure 5:
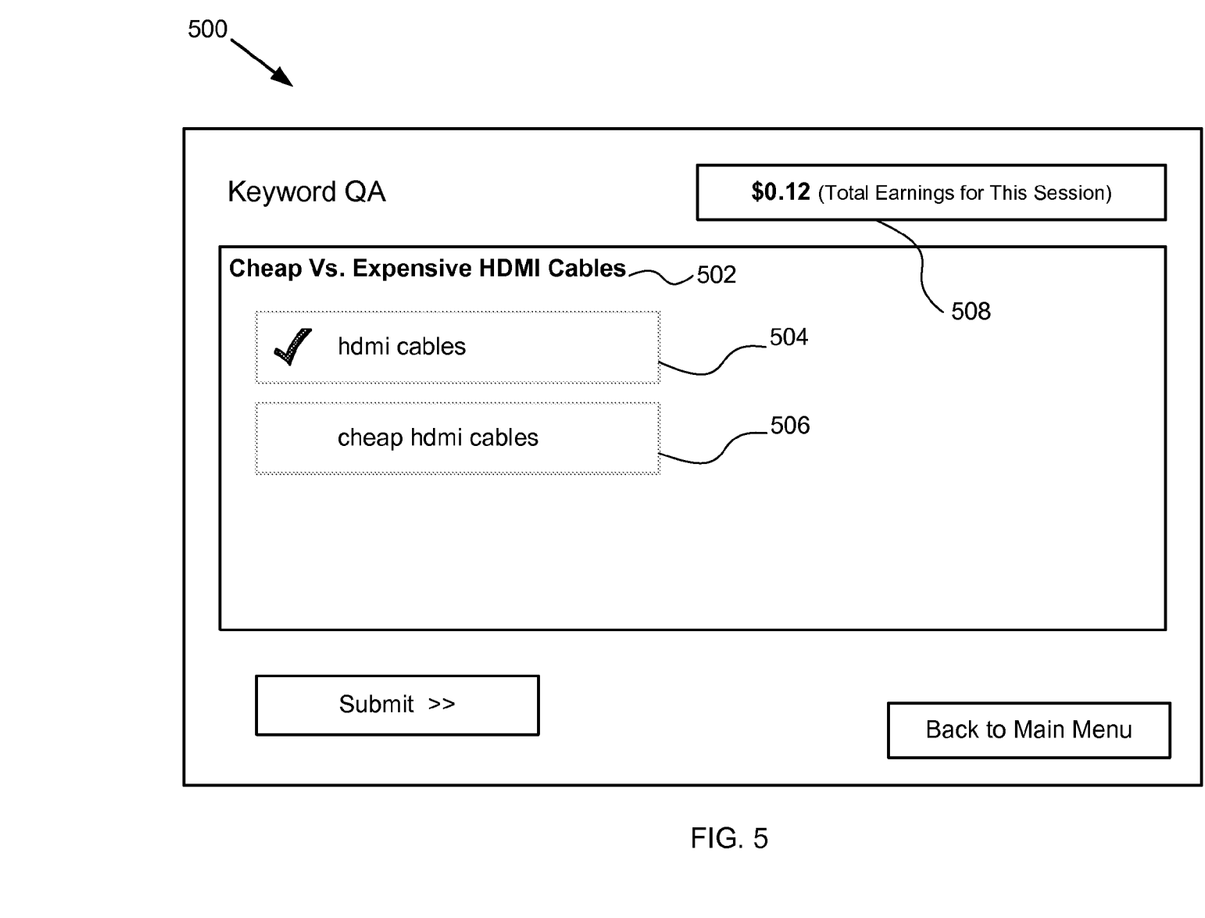
FIG. 5 is an exemplary screen shot illustrating the task of selecting a keyword result by an additional third person to act as a tie breaker, according to one embodiment of the present disclosure.

FIG. 5 is an exemplary screen shot 500 illustrating the task of selecting a keyword result by adding an additional third person, to act as a tie breaker, according to one embodiment. Here, two choices 504 and 506 are presented for selection to select the best or correct choice of a keyword phrase for a title 502. Two prior feedback providers did not agree on the same choice (e.g., having been presented with three or more choices). The two different choices selected by the prior feedback providers are choices 504 and 506, which are presented to the "tie breaker" person. After the tie breaker makes a selection, the choice is provided as the result if the accuracy is determined to be sufficiently high.

Here, it should also be noted that the feedback provider has an indication 508 (e.g., an earnings display box) of compensation or earnings that have been received for a current user session. For example, the feedback provider may be paid a certain monetary amount per choice selected (e.g., $0.01 per selection).

Figure 6:
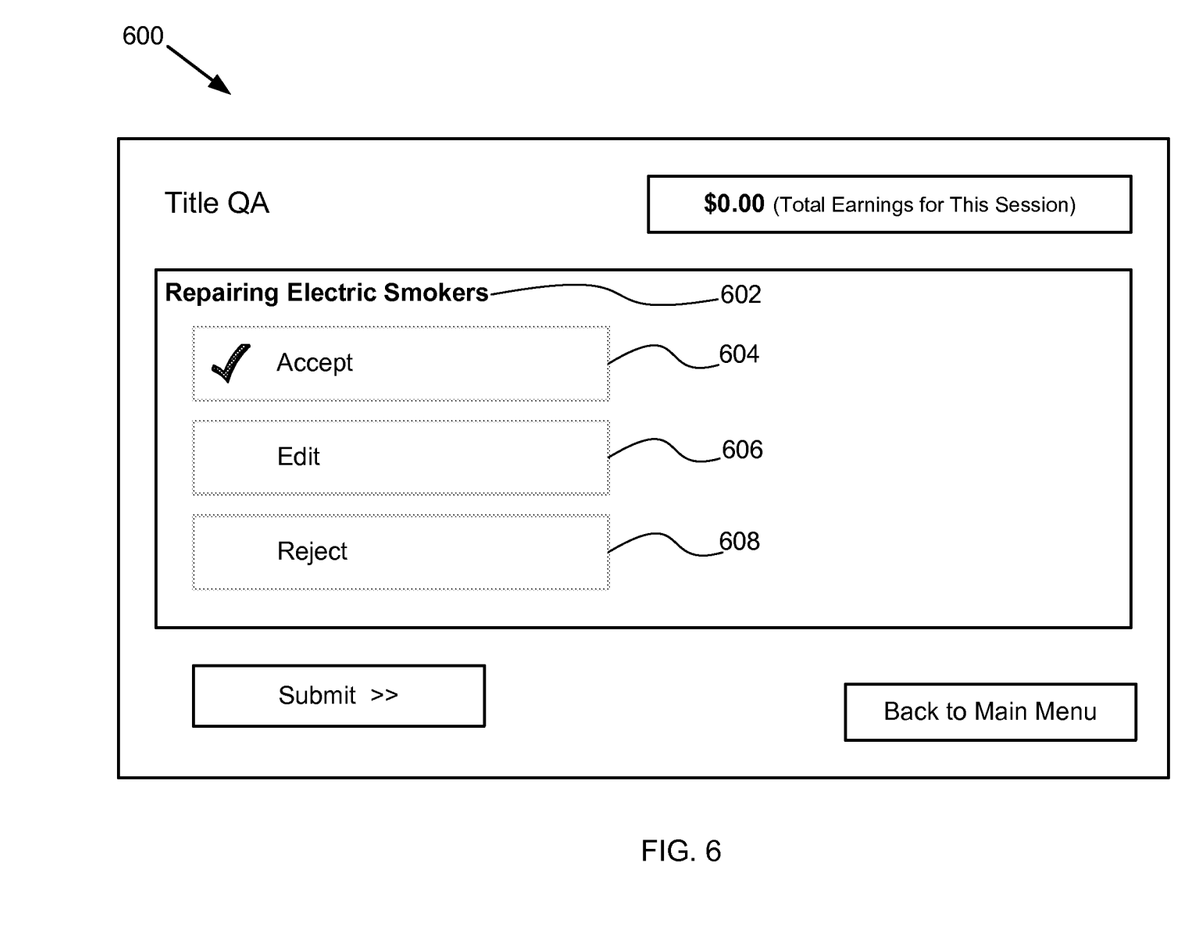
FIG. 6 is an exemplary screen shot illustrating the task of selecting an assessment result to assess a title being considered for potential use with a content publication, according to one embodiment of the present disclosure.

FIG. 6 is an exemplary screen shot 600 illustrating the task of selecting an assessment result to assess a title 602 being considered for potential use with a content publication, according to one embodiment. Choices 604, 606, and 608 are presented on, for example, a web page. Each choice is an assessment of title 602. The assessment may be based on predefined standards or guidelines for a suitable title. The feedback provider may make selections based on these standards or guidelines. If the result is "Edit" 606, then after editing, the edited title may then be submitted to a new set of feedback providers for determining whether the title is acceptable (e.g., for publication).

Several non-limiting examples of the determination of an accuracy for a result are provided below. These examples are intended to illustrate specific embodiments, and are not intended to limit the generality of the foregoing discussion.

In a first example, the situation of determining an accuracy level from individual persons (e.g., feedback providers) is described. Consider a simple situation of two choices being presented for selection: choice A (correct) and choice B (incorrect).

The required input parameter values are as follows:
$\rho$=probability that an individual person picks A ($\rho \in (0, 1)$)
$\alpha$=desired accuracy level ($\alpha \in (0, 1)$)
c=cost per rating
$\overline{C}$=maximum cost allowed per problem=$c\overline{S}$ (where $\overline{S}$=maximum number of ratings per problem)

Here, it is assumed that the person's individual accuracy or quality (as measured by the parameter $\rho$) is the same for all persons. This assumption may be relaxed in other embodiments to allow for a procedure that "kicks out" poor-quality persons (persons with an individual accuracy that falls below a minimum individual accuracy threshold).

The maximum number of ratings per problem $\overline{S}$ needs to be specified in order to make this problem feasible. Even with disagreements among the persons used to make the initial selections of choices (e.g., the first three or four persons), allowing for an unlimited number of persons requires the analysis to allow for the small probability that a consensus would be reached with a much larger number of persons.

Now consistent with this approach, individual persons are continued to be asked for their selection of a choice until either:

1. The probability of the consensus choice being correct is greater than $\alpha$ (in this case, accept the consensus choice and the cost is equal to c×number of persons).
2. It is impossible to achieve the desired accuracy $\alpha$ within $\overline{S}$ steps (in this case, the question is discarded or "thrown out" and the cost is equal to c×number of persons).

The output from the approach (given values of the parameters ($\rho$, $\alpha$, c, $\overline{S}$)) is as follows:

1. The percentage of questions that are answered (not thrown out).
2. The complete distribution of costs, which allows computation of the average cost.

Changing the accuracy level a permits making a graph of these outputs versus $\alpha$.

Regarding the implementation of the above approach, here are a few exemplary iterations to illustrate the above formulas:

1. First Person
If $\rho > \alpha$, accept the choice. Cost=c.
If $\rho < \alpha$, ask another person.
2. Second Person
If two persons agree and $$\frac{\rho^2}{\rho^2 + (1-\rho)^2} > \alpha,$$

accept the choice. Cost=2c.

If two persons agree and $$\frac{\rho^2}{\rho^2+(1-\rho)^2} > \alpha,$$

ask another person.

If two persons disagree and the desired accuracy level can still be achieved (this is a condition that depends upon ρ and $\overline{S}$), ask another person.

If two persons disagree and the desired accuracy level cannot be achieved, throw out the question. Cost=2c.

3. Third Person

If unanimous and $$\frac{\rho^3}{\rho^3+(1-\rho)^3} > \alpha,$$

accept the choice. Cost=3c.

If not unanimous and accuracy level can still be achieved (depending on ρ and $\overline{S}$), ask another person.

If not unanimous and accuracy level cannot be achieved, throw out the question. Cost=3c.

4. Fourth Person

If unanimous and $$\frac{\rho^4}{\rho^4+(1-\rho)^4} > \alpha,$$

accept the choice. Cost=4c.

If 3-1 vote and $$\frac{\rho^2}{\rho^2+(1-\rho)^2} > \alpha,$$

accept the consensus choice. Cost=4c.

If not unanimous and accuracy level can still be achieved (depending on ρ and $\overline{S}$), ask another person.

If not unanimous and accuracy level cannot be achieved, throw out the question. Cost=4c.

5. Fifth and Additional Persons

Continue the above approach until the $\overline{S}$-th person.

The probabilities of each of the cases in the approach above may be determined. With these probabilities, the outputs (e.g., percentage of questions that are accepted, or distribution of costs) may be calculated.

In a second example, there is a consideration of the extent of confidence associated with a selection or answer as different persons are answering a question, and of the cost required to obtain any given level of accuracy. For example, to obtain a 99.9% accuracy, answers from many persons will likely be discarded (i.e., the cost of a correct answer is related to the incorrect answers that may need to be tossed out). Related to the foregoing, a person with a 90% individual accuracy typically should be paid more than a person with an 80% accuracy. For example, a person with a 60% accuracy should not be paid, and a person with a lower accuracy should be dismissed.

Now considering achieving accuracy levels from individual persons, again consider the simple situation of two choices being presented for selection: choice A (correct) and choice B (incorrect).

The required input parameter values are as follows:
ρ=probability that an individual person picks A (ρ∈(0, 1))
α=desired accuracy level (α∈(0, 1))
c=cost per rating
$\overline{C}$=maximum cost allowed per problem=c$\overline{S}$ (where $\overline{S}$=maximum number of ratings per problem)

One aspect of this simple two-choice situation is now described. Specifically, if R persons have been polled so far with $R_{maj}$ picking one choice and $R_{min}$ picking the other choice (with $R_{maj} \geq R_{min}$ and $R_{maj}+R_{min}=R$), then the probability that the majority choice (the one with $R_{maj}$ persons) is the correct choice is equal to $$\frac{\rho^{Rmaj-Rmin}}{\rho^{Rmaj-Rmin}+(1-\rho)^{Rmaj-Rmin}}$$

The accuracy level depends only upon the vote difference for the two choices. As an example, suppose that ρ=0.75 (persons pick the consensus or right choice 75% of the time). When the vote difference is equal to one (which happens at votes of 1-0, 2-1, 3-2, etc.), the accuracy level is 0.75. When the vote difference is equal to two (which happens at votes of 2-0, 3-1, 4-2, etc.), the accuracy level is $0.75^2/(0.75^2+0.25^2)$ or 0.90. With ρ=0.75, we can summarize the accuracy levels for vote differences up to 4 in the following table:

| $R_{maj} - R_{min}$ | Prob. correct |
|---|---|
| 0 | 0.500 |
| 1 | 0.750 |
| 2 | 0.900 |
| 3 | 0.964 |
| 4 | 0.988 |

There is a natural "discontinuity" in this situation. To achieve an accuracy level of 75%, one may stop when one choice has a one-vote advantage (which trivially occurs after the first person's decision). To achieve an accuracy level of 80%, a one-vote advantage is not enough, so one may stop when one choice has a two-vote advantage. The two-vote advantage yields a 90% accuracy level (more than the desired accuracy level). So, one does not ever get an accuracy level of 80%. The only achievable accuracy rates are those reflected in the table above: 75%, 90%, 96.4%, and 98.8%.

Now an illustration of the algorithm's output is provided as follows:
ρ=0.75 (person efficiency 75%)
α=0.95 (desired accuracy 95%)

From the discussion above, one should expect an accuracy of 96.4% (the first number in the table above 95%). Here is the output, broken down step by step (with a maximum number of steps $\overline{S}$=7):

| Steps | Fraction ending | Weighted cost | Fraction rejected of those ending | Accuracy level of accepted questions |
|---|---|---|---|---|
| 1 | 0.000 | 0.000 | 0.000 | — |
| 2 | 0.000 | 0.000 | 0.000 | — |
| 3 | 0.438 | 1.314 | 0.000 | 0.964 |
| 4 | 0.000 | 0.000 | 0.000 | — |
| 5 | 0.246 | 1.230 | 0.000 | 0.964 |
| 6 | 0.119 | 0.714 | 1.000 | — |
| 7 | 0.198 | 1.386 | 0.300 | 0.964 |

Here are the overall outcomes:
Fraction thrown out: 17.8%
Overall accuracy of accepted questions: 96.4%

Average number of steps (proportional to cost): 4.639
Cost per accepted question: 5.644

This algorithm is based upon passing a question to persons as long as it is possible to eventually attain the efficiency with enough consensus. An alternative algorithm is to hold onto questions only if accuracy can be achieved within the next s* steps. As an example, the same approach is done as above with s*=2, which yields the following:

| Steps | Fraction ending | Weighted cost | Fraction rejected of those ending | Accuracy level of accepted questions |
|---|---|---|---|---|
| 1 | 0.000 | 0.000 | 0.000 | — |
| 2 | 0.375 | 0.750 | 1.000 | — |
| 3 | 0.438 | 1.314 | 0.000 | 0.964 |
| 4 | 0.070 | 0.280 | 1.000 | — |
| 5 | 0.082 | 0.410 | 0.000 | 0.964 |
| 6 | 0.013 | 0.078 | 1.000 | — |
| 7 | 0.022 | 0.154 | 0.300 | 0.964 |

Here are the overall outcomes:
Fraction thrown out: 46.5%
Overall accuracy of accepted questions: 96.4%
Average number of steps (proportional to cost): 2.987
Cost per accepted question: 5.584

Compared to the original algorithm, many more questions are thrown out, but the number of steps per question is much smaller. The resulting cost per accepted question is actually slightly smaller than the original one (although very similar in magnitude).

In light of this second example above, the basic set-up analysis is as follows: For any given person's efficiency level $\rho$, there is a set of achievable accuracy levels (dictated by the formulas above). For any of these accuracy levels, one can run an algorithm in order to infer the distribution of steps, weighted costs, and percentage of accepted questions. The algorithm can be done by (i) setting $\overline{S}$ alone or (ii) setting $\overline{S}$ and s* (where the latter setting will throw more questions out, but have lower average rating steps).

In a third example, the situation of having a general number of A choices is discussed. As the number of choices increases to larger numbers (e.g., 100 choices), having two people pick the same choice has a different implication for accuracy than if the number of choices is small (e.g., 3 choices). For example, if there are 1000 choices and 10 people pick the same single choice, even though other people may be picking other, random choices, there is a higher confidence in that same single choice.

The situation of achieving accuracy levels from individual persons (also referred to below as "raters") where there are more than two choices is now discussed in more detail. Consider the more general situation where there are more than two alternatives (let A denote the number of alternatives):
choice 1 (correct)
choice 2 (incorrect)
.
.
.
choice A (incorrect)

The required input parameter values are as follows:
$\rho_a$=probability that an individual rater picks alternative a, for a=1, ..., A−1
$\alpha$=desired accuracy level ($\alpha \in (0, 1)$)
c=cost per rating
$\overline{C}$=maximum cost allowed per problem=$c\overline{S}$ (where $\overline{S}$=maximum number of ratings per problem)

The additional alternatives require the specification of additional parameters in the system. In the two-choice case (A=2), one need only specify the probability of choice 1 ($\rho_1$) since the probability of choice 2 ($\rho_2$) must be equal to 1−$\rho_1$.

In a situation with four alternatives (A=4) from which raters can pick, three of the probabilities need to be specified ($\rho_1, \rho_2, \rho_3$) and then the last probability $\rho_4$ is equal to 1−$\rho_1$−$\rho_2$−$\rho_3$. For example, one might have a rater picking choice 1 (correct) 70% of the time ($\rho_1$=0.7) with equal probabilities for the other choices ($\rho_2$=$\rho_3$=$\rho_4$=0.1). Alternatively, one might have the same $\rho_1$ value ($\rho_1$=0.7), but different probabilities for the other choices (perhaps $\rho_2$=0.2, $\rho_3$=$\mu_4$=0.05).

Compared to the two-choice case (considered in the examples above), the general case is more complicated—(i) the probability expressions do not simplify in the same way, and (ii) the implementation of the algorithm requires additional programming.

Here are some brief examples of the probability expressions that arise (where $\rho_A$=1−$\rho_1$− ... − $\rho_{A-1}$ in all of what follows):

Example A: pattern of XX after two raters (both agree)

$$Pr(\text{correct}) = \frac{\rho_1^2}{\rho_1^2 + \rho_2^2 + \Lambda + \rho_A^2}$$

Example B: pattern of XYX after three raters $$Pr(\text{correct}) = \frac{\rho_1^2(1-\rho_1)}{\sum_{a=1}^{A} \rho_a^2(1-\rho_a)}$$

Example C: pattern of XYZX after four raters $$Pr(\text{correct}) = \frac{\rho_1^2 \sum_{a'=2}^{A} \sum_{a'' \neq a', a'' \geq 2} \rho_{a'} \rho_{a''}}{\sum_{a=1}^{A} \rho_a^2 \sum_{a' \neq a}^{A} \sum_{a'' \neq a', a'' \neq a} \rho_{a'} \rho_{a''}}$$

The algorithm can be implemented as follows:
Continue through raters 1 ..., $\overline{S}$ until either:
   The accuracy level can be met (accept question), or
   The accuracy level is not met and cannot be met (throw out question).
At a given step s (for s∈{1, ..., $\overline{S}$}), one computes the probability that the majority choice is correct given the observed sequence of choices (these probabilities are computed along the lines shown in the examples above).
   If this probability is greater than $\alpha$, the question is accepted.
   If the probability is less than $\alpha$, one determines the maximum attainable probability by step $\overline{S}$ (or, alternatively, within some maximum number of additional steps). This maximal probability is determined by assuming that the majority choice will be exclusively chosen in the future by raters.
   If the maximal probability is less than $\alpha$, throw out the question.
   If the maximal probability is greater than $\alpha$, proceed to step s+1.

As used herein, the term module refers to logic embodied in hardware or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays. The modules described herein are typically implemented as software modules, but could be represented in hardware or firmware.

In one embodiment, each module is provided as a modular code object, where the code objects typically interact through a set of standardized function calls. In one embodiment, the code objects are written in a suitable software language such as C++, but the code objects can be written in any low level or high level language. In one embodiment, the code modules are implemented in C++ and compiled on a computer running a content server, such as, for example, Microsoft® IIS or Linux® Apache. In alternative embodiments, the code modules can be compiled with their own front end on a kiosk, or can be compiled on a cluster of server machines serving content through a cable, packet, telephone, satellite, or other telecommunications network. Artisans of skill in the art will recognize that any number of implementations, including code implementations directly to hardware, are also possible.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system. While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine readable medium in their entirety at a particular instance of time. Examples of computer-readable media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROMS), Digital Versatile Disks (DVDs), etc.), among others.

The computer-readable media may store the instructions. In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system. Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The disclosure includes methods and apparatuses which perform these methods, including data processing systems which perform these methods, and computer readable media containing instructions which when executed on data processing systems cause the systems to perform these methods.

While the methods and systems have been described in terms of what are presently considered to be preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures.

It should also be understood that a variety of changes may be made without departing from the essence of the disclosure. Further, each of the various elements of the disclosure may also be achieved in a variety of manners. This disclosure should be understood to encompass each such variation, be it a variation of an embodiment of any apparatus embodiment, a method or process embodiment, or even merely a variation of any element of these.

The use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps

The invention claimed is:

1. A method of distributing data over a network to a remote computing system, the method comprising:
   providing a first computing device comprising at least one processor and a storage device coupled to the at least one processor for storage of data, the storage device comprising at least one memory;
   providing software for installation on the remote computing system, the software to communicate over the network with the first computing device, and the remote computing system configured to perform transcription based on data received from the first computing device;
   storing, by a feedback module of the first computing device, in at least one database of the storage device, a plurality of individual accuracies, each individual accuracy for a respective feedback computing device, and each individual accuracy proportional to a number of prior results for prior tasks performed by the respective feedback computing device that are with a consensus of feedback computing devices that have also performed the prior tasks, the prior results automatically obtained based on user input during operation of the respective feedback computing device;
   receiving, by a result module of the first computing device, over the network from the remote computing system, a request for a result for a task, the request comprising a desired accuracy level;
   determining, by the first computing device, an accuracy for the result using the respective individual accuracy for each of a first plurality of feedback computing devices selecting the result, each respective individual accuracy retrieved from the storage device; and
   providing, by the result module, the result when the accuracy of the result is equal to or greater than the desired accuracy level, the providing comprising providing, over the network, the result to the software on the remote computing system, the providing of the result to cause display of the result by the software on a web page in a user interface of the remote computing system, the providing of the result to enable transcription of data by the remote computing system, and the transcription comprising automatic selection, based on the result, of text to include in the transcription.

2. The method of claim 1, wherein each respective individual accuracy is determined based on a comparison of prior results for the respective feedback computing device with prior results for a second plurality of feedback computing devices.

3. The method of claim 2, wherein at least a portion of the first plurality of feedback computing devices is present in the second plurality of feedback computing devices.

4. The method of claim 1, wherein the task is selection of one of a plurality of choices presented in a web page on a display of a feedback computing device, and the result is a selected one of the choices.

5. The method of claim 4, wherein the choices are a list of potential titles for a content item, and the result is a single title selected from the list of titles.

6. A method of distributing data over a network to a remote computing system, the method comprising:
   providing a first computing device comprising at least one processor and a storage device coupled to the at least one processor for storage of data, the storage device comprising at least one memory;
   providing software for installation on the remote computing system, the software to communicate over the network with the first computing device, and the remote computing system configured to perform transcription based on data received from the first computing device;
   storing, by a feedback module of the first computing device, in at least one database of the storage device, a plurality of individual accuracies, each individual accuracy for a respective feedback computing device, and each individual accuracy proportional to a number of prior results for prior tasks performed by the respective feedback computing device that are with a consensus of feedback computing devices that have also performed the prior tasks, the prior results automatically obtained based on user input during operation of the respective feedback computing device;
   receiving, by a result module of the first computing device, over the network from the remote computing system, an automated request for a result for a task, the request comprising a desired accuracy level, wherein the task is selection of one of a plurality of choices presented at a feedback computing device, and the result is a selected one of the choices;
   presenting, by the first computing device, the result to a first plurality of feedback computing devices, wherein a first subset of the first plurality of feedback computing devices select the result, by user input on the respective feedback computing device, and a second subset of the first plurality of feedback computing devices do not select the result;
   determining, by the first computing device, an accuracy for the result using a respective individual accuracy for each of the first subset of the first plurality of feedback computing devices, each respective individual accuracy retrieved from the storage device; and
   providing, by the result module, the result when the accuracy of the result is equal to or greater than the desired accuracy level, the providing comprising providing, over the network, the result to the software on the remote computing system, the providing of the result to cause display of the result by the software on a web page in a user interface of the remote computing system, the providing of the result to enable transcription of data by the remote computing system, and the transcription comprising automatic selection, based on the result, of text to include in the transcription.

7. The method of claim 6, wherein each respective individual accuracy is determined based on a comparison of prior results for prior tasks performed by the respective feedback computing device with prior results for the prior tasks performed by a second plurality of feedback computing devices.

8. The method of claim 7, wherein at least a portion of the first plurality of feedback computing devices is present in the second plurality of feedback computing devices.

9. The method of claim 6, wherein the selection comprises reviewing titles presented on a display, the choices are a list of potential titles for a content item, and the result is a single title selected from the list of titles.

10. The method of claim 6, wherein a number of the first plurality of feedback computing devices is increased until accuracy of the result is equal to or greater than the desired accuracy level.

11. The method of claim 1, wherein a respective cost per task is associated with each of the first plurality of feedback computing devices, the method additionally comprising:
   determining a total cost based on the respective cost per task for each of the first plurality of feedback computing devices.

12. The method of claim 11, wherein the total cost is a sum of the respective cost per task for each of the first plurality of feedback computing devices.

13. The method of claim 11, further comprising increasing a number of the first plurality of feedback computing devices until the total cost exceeds a maximum cost.

14. The method of claim 11, such that where total cost exceeds a maximum cost, the result is not provided.

15. A non-transitory computer-storage medium storing instructions configured to instruct, for distributing data over a network to a remote computing system, a first computing device to:
- communicate over the network with software on the remote computing system, the remote computing system configured to perform transcription based on data received from the first computing device, the first computing device comprising at least one processor and a storage device coupled to the at least one processor for storage of data, and the storage device comprising at least one memory;
- store, by a feedback module of the first computing device, in at least one database of the storage device, a plurality of individual accuracies, each individual accuracy for a respective feedback computing device, and each individual accuracy proportional to a number of prior results for prior tasks performed by the respective feedback computing device that are with a consensus of feedback computing devices that have also performed the prior tasks, the prior results automatically obtained based on user input during operation of the respective feedback computing device;
- receive, by a result module of the first computing device, over the network, from the remote computing system, a request for a result for a task, the request comprising a desired accuracy level, wherein the task is selection by user input of one of a plurality of choices presented on a web page at a feedback computing device, and the result is a selected one of the choices;
- determine, by the first computing device, an accuracy for the result using a respective individual accuracy for each of a plurality of feedback computing devices selecting the result, wherein a respective cost per task is associated with each of the plurality of feedback computing devices, and each respective individual accuracy is retrieved from the storage device;
- determine, by the at least one processor, a total cost for providing the result based on the respective cost per task for each of the plurality of feedback computing devices; and
- provide, by the result module, to the software on the remote computing system, over the network, the result when the accuracy of the result is equal to or greater than the desired accuracy level, the providing of the result to cause display of the result by the software on a web page in a user interface of the remote computing system, the providing of the result to enable transcription of data by the remote computing system, and the transcription comprising automatic selection, based on the result, of text to include in the transcription.

16. A system for distributing data over a network to a remote computing system, the system comprising:
- a storage device comprising memory storing at least one database comprising a plurality of individual accuracies, each individual accuracy for a respective feedback computing device, and each individual accuracy proportional to a number of prior results for prior tasks performed by the respective feedback computing device that are with a consensus of feedback computing devices that have also performed the prior tasks, the prior results automatically obtained based on user input during operation of the respective feedback computing device;
- at least one processor coupled to the storage device; and
- memory storing instructions configured to instruct the at least one processor to:
  - communicate over the network with software on the remote computing system, the remote computing system configured to perform transcription based on received data;
  - receive, by a result module, over the network from the remote computing system, a request for a result for a task, the request comprising a desired accuracy level;
  - present the result to a plurality of feedback computing devices, wherein a first subset of the plurality of feedback computing devices select the result, by user input on the respective feedback computing device, and a second subset of the plurality of feedback computing devices do not select the result;
  - determine an accuracy for the result using a respective individual accuracy for each of the first subset of the plurality of feedback computing devices, each respective individual accuracy retrieved from the at least one database; and
  - provide, by the result module over the network, to the software on the remote computing system, the result when the accuracy of the result is equal to or greater than the desired accuracy level, the providing of the result to cause display of the result by the software on a web page in a user interface of the remote computing system, the providing of the result to enable transcription of data by the remote computing system, and the transcription comprising automatic selection, based on the result, of text to include in the transcription.

17. A non-transitory computer-storage medium storing instructions configured to instruct, for distributing data over a network to a remote computing system, a first computing device to:
- communicate over the network with software on the remote computing system, the remote computing system configured to perform transcription based on data received from the first computing device, the first computing device comprising at least one processor and a storage device coupled to the at least one processor for storage of data, and the storage device comprising at least one memory;
- store, by a feedback module of the first computing device, in at least one database of the storage device, a plurality of individual accuracies, each individual accuracy for a respective feedback computing device, and each individual accuracy proportional to a number of prior results for prior tasks performed by the respective feedback computing device that are with a consensus of feedback computing devices that have also performed the prior tasks, the prior results automatically obtained based on user input during operation of the respective feedback computing device;
- receive, by a result module of the first computing device, over the network from the remote computing system, a request for a result for a task, the request comprising a desired accuracy level;
- present, by the first computing device, over a network, the result to a plurality of feedback computing devices, wherein a first subset of the plurality of feedback computing devices select the result, by user input on the respective feedback computing device, and a second subset of the plurality of feedback computing devices do not select the result;
- determine, by the first computing device, an accuracy for the result using a respective individual accuracy for each of the first subset of the plurality of feedback computing devices, each respective individual accuracy retrieved from the storage device; and
- provide, by the result module, to the software on the remote computing system, the result when the accuracy of the result is equal to or greater than the desired accuracy level, the providing of the result to cause display of the result by the software on a web page in a user interface of the remote computing system, the providing of the result to enable transcription of data by the remote computing system, and the transcription comprising automatic selection, based on the result, of text to include in the transcription.

18. A method of distributing data over a network to a remote computing system, the method comprising:

provisioning a first computing device comprising at least one processor and a storage device coupled to the at least one processor for storage of data, the storage device comprising at least one memory;

providing software for installation on the remote computing system, the software to communicate over the network with the first computing device, and the remote computing system configured to perform transcription based on data received from the first computing device;

receiving, over a network, feedback from each of a plurality of feedback computing devices that has reviewed titles for content items, the feedback comprising selection of a result by user input on each respective feedback computing device;

determining a plurality of individual accuracies, one for each of the plurality of feedback computing devices, based on the feedback, and each individual accuracy proportional to a number of prior results for prior tasks performed by the respective feedback computing device that are with a consensus of feedback computing devices that have also performed the prior tasks, the prior results automatically obtained based on user input during operation of the respective feedback computing device;

storing, by a feedback module, in at least one database of the storage device, the plurality of individual accuracies;

receiving, by a result module of the first computing device, over the network from the remote computing system, a request for a selection of a single title from a list of potential titles for a content item, the request comprising a desired accuracy level;

determining, by the first computing device, an accuracy for the single title selection using the plurality of individual accuracies;

increasing, by the at least one processor, a number of feedback computing devices used in the determining the accuracy until the accuracy for the single title selection is equal to or greater than the desired accuracy level; and providing, by the result module, to the software on the remote computing system, in response to the request, the single title selection when the accuracy for the single title selection is equal to or greater than the desired accuracy level, the providing of the selection to cause display of the selection by the software on a web page in a user interface of the remote computing system, the providing of the selection to enable transcription of data by the remote computing system, and the transcription comprising automatic selection, based on the selection, of text to include in the transcription.

19. The method of claim 1, wherein the consensus is based on a frequency of a content material being selected.

\* \* \* \* \*